(12) United States Patent
Okui et al.

(10) Patent No.: US 10,675,611 B2
(45) Date of Patent: Jun. 9, 2020

(54) CARBON POWDER FOR FUEL CELL AND CATALYST, ELECTRODE CATALYST LAYER, MEMBRANE ELECTRODE ASSEMBLY, AND FUEL CELL USING THE CARBON POWDER FOR FUEL CELL

(71) Applicants: NISSAN MOTOR CO., LTD., Yokohama-shi, Kanagawa (JP); TOYO TANSO CO., LTD., Osaka-shi, Osaka (JP)

(72) Inventors: Takehiko Okui, Kanagawa (JP); Hiroyuki Tanaka, Kanagawa (JP); Kazuki Arihara, Kanagawa (JP); Tetsuya Mashio, Kanagawa (JP); Atsushi Ohma, Kanagawa (JP); Takahiro Morishita, Osaka (JP); Yoshio Shodai, Osaka (JP)

(73) Assignees: NISSAN MOTOR CO., LTD., Yokohama-shi (JP); TOYO TANSO CO., LTD., Osaka-shi (JP)

( * ) Notice: Subject to any disclaimer, the term of this patent is extended or adjusted under 35 U.S.C. 154(b) by 0 days.

(21) Appl. No.: 16/083,606

(22) PCT Filed: Jan. 18, 2017

(86) PCT No.: PCT/JP2017/001607
§ 371 (c)(1),
(2) Date: Sep. 10, 2018

(87) PCT Pub. No.: WO2017/154359
PCT Pub. Date: Sep. 14, 2017

(65) Prior Publication Data
US 2019/0083957 A1    Mar. 21, 2019

(30) Foreign Application Priority Data
Mar. 11, 2016 (JP) .................. 2016-048911

(51) Int. Cl.
*H01M 4/96* (2006.01)
*B01J 21/18* (2006.01)
(Continued)

(52) U.S. Cl.
CPC ............... *B01J 21/18* (2013.01); *B01J 23/42* (2013.01); *B01J 35/006* (2013.01); *B01J 35/10* (2013.01);
(Continued)

(58) Field of Classification Search
CPC ........... H01M 4/96; H01M 2008/1095; H01M 4/926; H01M 4/9083
See application file for complete search history.

(56) References Cited

U.S. PATENT DOCUMENTS

2009/0136808 A1    5/2009  Kang et al.
2009/0208780 A1*   8/2009  Sun .................. B82Y 30/00
                                              429/528
(Continued)

FOREIGN PATENT DOCUMENTS

CA    2925618 A1    4/2015
CN    105098186 A   11/2015
(Continued)

OTHER PUBLICATIONS

Su et al. (Chem. Mater. 2005, 17, 3960-3967).*

*Primary Examiner* — Olatunji A Godo
(74) *Attorney, Agent, or Firm* — Foley & Lardner LLP (57) ABSTRACT

Provided are a carbon powder which can provide a catalyst exhibiting high performance and a catalyst. A carbon powder for fuel cell comprising carbon as a main component, which has a ratio (B/A) of an area B of peak 1 to an area A of peak 0 of more than 0 and 0.15 or less, wherein the area A represents an area of peak 0 at a position of $2\theta=22.5°$ to $25°$ as observed by XRD analysis when the carbon powder (Continued)

for fuel cell is subjected to heat treatment at 1800° C. for 1 hour in an inert atmosphere, and the area B represents an area of peak 1 at a position of $2\theta=26°$ as observed by XRD analysis when the carbon powder for fuel cell is subjected to heat treatment at 1800° C. for 1 hour in an inert atmosphere.

15 Claims, 1 Drawing Sheet

(51) Int. Cl.
| | | |
|---|---|---|
| *B01J 23/42* | (2006.01) | |
| *B01J 35/10* | (2006.01) | |
| *C01B 32/00* | (2017.01) | |
| *H01M 4/92* | (2006.01) | |
| *H01M 4/86* | (2006.01) | |
| *C01B 32/20* | (2017.01) | |
| *B01J 35/00* | (2006.01) | |
| *B01J 37/08* | (2006.01) | |
| *B01J 37/34* | (2006.01) | |
| *H01M 4/90* | (2006.01) | |
| *H01M 8/1018* | (2016.01) | |

(52) U.S. Cl.
CPC ............. *B01J 37/08* (2013.01); *B01J 37/343* (2013.01); *C01B 32/00* (2017.08); *C01B 32/20* (2017.08); *H01M 4/8605* (2013.01); *H01M 4/9083* (2013.01); *H01M 4/926* (2013.01); *H01M 4/96* (2013.01); *H01M 8/1018* (2013.01); *H01M 2004/8684* (2013.01); *H01M 2004/8689* (2013.01); *H01M 2300/0082* (2013.01)

(56) References Cited

U.S. PATENT DOCUMENTS

| | | |
|---|---|---|
| 2012/0231338 A1 | 9/2012 | Matsuzaka et al. |
| 2015/0352522 A1 | 12/2015 | Mizuuchi et al. |
| 2016/0093892 A1 | 3/2016 | Hori et al. |
| 2016/0233520 A1 | 8/2016 | Takahashi et al. |

FOREIGN PATENT DOCUMENTS

| | | |
|---|---|---|
| JP | 2007-290936 A | 11/2007 |
| JP | 2007-311026 A | 11/2007 |
| JP | 2011-115760 A | 6/2011 |
| KR | 10-2009-0054706 A | 6/2009 |
| WO | WO 2014/129597 A1 | 8/2014 |
| WO | WO 2014/185498 A1 | 11/2014 |
| WO | WO 2015/045852 A1 | 4/2015 |
| WO | WO-2016/094551 A1 | 6/2016 |
| WO | WO 2016/152506 A1 | 9/2016 |

\* cited by examiner

FIG.1

CARBON POWDER FOR FUEL CELL AND CATALYST, ELECTRODE CATALYST LAYER, MEMBRANE ELECTRODE ASSEMBLY, AND FUEL CELL USING THE CARBON POWDER FOR FUEL CELL

TECHNICAL FIELD

The present invention relates to a carbon powder for fuel cell, particularly a carbon powder for fuel cell catalyst, and a catalyst, an electrode catalyst layer, a membrane electrode assembly and a fuel cell using the carbon powder for fuel cell.

BACKGROUND ART

A polymer electrolyte fuel cells (PEFC) using a proton conductive solid polymer membrane works at a lower temperature than other types of fuel cells, for example, solid oxide fuel cells and molten carbonate fuel cells. For this reason, the polymer electrolyte fuel cell is expected as a stationary power source and a power source for moving bodies such as motor vehicles, and it has been started to put the polymer electrolyte fuel cells to practical use as well.

In general, an expensive metal catalyst typified by Pt (platinum) or a Pt alloy has been used in such a polymer electrolyte fuel cell. In addition, a carbon carrier having a large specific surface area or a doped carbon carrier has been used as a carrier supporting a metal catalyst in order to highly support and disperse the metal catalyst. However, the conventional carbon carrier has not been able to sufficiently achieve activity of supported platinum while taking full advantage of characteristics of a carbon material.

In order to solve the above problem, for example, Patent Literature 1 discloses an electrode catalyst for fuel cell having platinum or a platinum alloy supported on a carbon alloy fine particle (carbon substrate) to be doped with at least either of a nitrogen atom or a boron atom and having an average particle size of 45 μm or less. The Patent Literature 1 discloses that the catalyst supporting platinum exhibits high activity since the carbon alloy fine particle described therein has an increased number of electronically and chemically active edge surfaces.

CITATION LIST

Patent Literatures

Patent Literature 1: JP 2007-311026 A

SUMMARY OF INVENTION

Technical Problem

However, the catalyst described in the Patent Literature 1 has not been able to exhibit sufficient activity depending on the application (for example, a fuel cell for vehicle).

Accordingly, the present invention has been made in view of the above circumstances, and an object thereof is to provide a carbon powder for fuel cell, which can exhibit high catalytic activity at the time of supporting a catalyst metal thereon.

Another object of the present invention is to provide a catalyst, an electrode catalyst layer, a membrane electrode assembly, and a fuel cell which can exhibit excellent power generation performance and/or durability.

Solution to Problem

The present inventors have conducted intensive studies to solve the above problems, to find that the above problems can be solved by using a carbon powder for fuel cell having specific crystallinity as a carrier, and thus completed the present invention.

BRIEF DESCRIPTION OF DRAWINGS

In FIG. 1, a reference numeral 1 denotes a polymer electrolyte fuel cell (PEFC); a reference numeral 2 denotes a solid polymer electrolyte membrane; a reference numeral 3a denotes an anode catalyst layer; a reference numeral 3c denotes a cathode catalyst layer; a reference numeral 4a denotes an anode gas diffusion layer; a reference numeral 4c denotes a cathode gas diffusion layer; a reference numeral 5a denotes an anode separator; a reference numeral 5c denotes a cathode separator; a reference numeral 6a denotes an anode gas flow path; a reference numeral 6c denotes a cathode gas flow path; a reference numeral 7 denotes a refrigerant flow path; and a reference numeral 10 denotes a membrane electrode assembly (MEA), respectively.

DESCRIPTION OF EMBODIMENTS

The carbon powder for fuel cell of the present invention (in the present specification, also simply referred to as the "carbon powder" or "carbon powder of the present invention") contains carbon as a main component. As used herein, the phrase "carbon powder contain carbon as a main component" means that the carbon powder is composed only of carbon or is substantially composed of carbon, and an element(s) other than carbon may be contained. The phrase "substantially composed of carbon" means that carbon accounts for 98% by weight or more and preferably 99.5% by weight or more (upper limit: less than 100% by weight) of the entire carbon powder.

In addition, the carbon powder for fuel cell of the present invention satisfies the following configuration (i):

(i) it has a ratio (B/A) of an area B of peak 1 to an area A of peak 0 of more than 0 and 0.15 or less. A carbon powder for fuel cell, which satisfies the configuration (i), has low crystallinity and thus can support a catalyst metal in a highly dispersed manner. Hence, a catalyst exhibiting excellent catalytic activity can be provided by using the carbon powder for fuel cell of the present invention as a carrier. The area A is an area of peak 0 at a position of 2θ=22.5° to 25° as observed by XRD analysis when the carbon powder for fuel cell is subjected to heat treatment at 1800° C. for 1 hour in an inert atmosphere. In addition, the area B is an area of peak 1 at a position of 2θ=26° as observed by XRD analysis when the carbon powder for fuel cell is subjected to heat treatment at 1800° C. for 1 hour in an inert atmosphere.

In the present description, a peak 0 at the position of 2θ=22.5° to 25° as observed by XRD analysis when the carbon powder for fuel cell is subjected to heat treatment at 1800° C. for 1 hour in an inert atmosphere is simply referred to as "peak 0", and an area of peak 0 is also simply referred to as "area A". Similarly, in the present specification, a peak 1 at the position of 2θ=26° as observed by XRD analysis when the carbon powder for fuel cell is subjected to heat treatment at 1800° C. for 1 hour in an inert atmosphere is simply referred to as "peak 1", and an area of peak 1 is also simply referred to as "area B". In addition, in the present specification, a ratio of an area B to an area A is also referred to as "B/A" or "B/A ratio".

In the carbon alloy fine particle described in the Patent Literature 1 above, the development of X-ray diffraction line in the basal surface direction of the carbon structure is suppressed and a proportion of edge surfaces in the direction perpendicular to the basal surface is increased. It is described that by the increased proportion of edge surfaces, a proportion of platinum or platinum alloy in contact with the edge surface increases to improve catalytic activity (paragraph "0017" in Patent Literature 1). However, it has been difficult to say that the activity of the catalyst having a catalyst metal supported on the carbon alloy fine particle is sufficient depending on the application. In addition, the edge surface exhibits weak oxidation resistance. In a catalyst layer containing a catalyst using such carbon alloy fine particle as a carrier, corrosion of the carbon carrier is caused by electrochemical oxidation reaction ($C+2H_2O \rightarrow CO_2 + 4H^+ + 4e^-$) which generates carbon dioxide using water present in the layer as an oxidant. The carbon corrosion causes a problem particularly at the time of repetitive starting and stopping/continuous operation. For this reason, the catalyst using the carbon alloy fine particle described in Patent Literature 1 as a carrier exhibits inferior durability particularly by the carbon deterioration at the time of starting and stopping/continuous operation.

On the contrary, the carbon powder according to the present invention satisfies (i) described above. A catalyst metal is hardly supported on a carbon powder exhibiting high crystallinity, since a surface energy of a portion exhibiting high crystallinity is low. The carbon powder according to the present invention exhibits low crystallinity (has a small B/A ratio). Accordingly, since a catalyst metal (for example, platinum) stably adsorbs on the carbon powder, it is possible to suppress/prevent sintering of the catalyst metal when supporting the catalyst metal on the carrier powder. Also, the catalyst metal can be supported on the carbon powder exhibiting low crystallinity in a highly dispersed manner in the form of small particles. Accordingly, a catalyst having a catalyst metal supported on such a carbon powder has an increased specific surface area of catalyst metal. Accordingly, in such a catalyst, a contact area of the catalyst metal with a reaction gas increases, to improve mass specific activity. Therefore, a catalyst obtained by supporting a catalyst metal on the carbon powder of the present invention can exert high activity (for example, mass specific activity). Incidentally, durability generally decreases when crystallinity is low (B/A ratio is small). However, the carbon powder according to the present invention has fewer edge surfaces exhibiting weak oxidation resistance, since it is fabricated under specific conditions for heat treatment which will be described in detail later. Here, an electronic state at an edge (end portion) of a graphene molecule, unlike that at a central portion (six-membered ring) of a graphene molecule, is likely to be a starting point of carbon corrosion. The carbon powder according to the present invention has fewer edge surfaces exhibiting such weak oxidation resistance, and thus it is hardly susceptible to the oxidation reaction which can take place at the time of starting and stopping/continuous operation (exhibits excellent oxidation resistance) and exhibits excellent electrochemical corrosion resistance (is hardly corroded). Accordingly, a catalyst obtained by supporting a catalyst metal on the carbon powder of the present invention exhibits excellent durability. Incidentally, the effect described above is particularly remarkable when a ratio R'(D'/G intensity ratio) of peak intensity (D' intensity) of D' band as measured in the vicinity of 1620 $cm^{-1}$ by Raman spectroscopy to peak intensity (G intensity) of G band as measured in the vicinity of 1580 $cm^{-1}$ by Raman spectroscopy is 0.30 or less.

Therefore, the carbon powder for fuel cell of the present invention can exert high catalytic activity when a catalyst metal is supported thereon. In addition, the carbon powder for fuel cell of the present invention exhibits excellent durability and can maintain high catalytic activity when a catalyst metal is supported thereon.

By using the carbon powder of the present invention as a carrier, it is possible to provide a catalyst exhibiting excellent catalytic activity and durability, and an electrochemical device (for example, MEA and capacitor) exhibiting high performance and high durability. Accordingly, the carbon powder for fuel cell of the present invention can be suitably used as a carrier in a catalyst, particularly a catalyst for fuel cell. Specifically, the present invention includes a catalyst for fuel cell which includes a catalyst metal supported on the carbon powder for fuel cell of the present invention. In addition, the carbon powder (carrier) for fuel cell of the present invention has a small amount of carbon edge. Accordingly, with the catalyst for fuel cell of the present invention, it is possible to suppress/prevent decrease in performance due to carbon corrosion, that is, to improve durability. The catalyst for fuel cell obtained by supporting a catalyst metal on the carbon powder for fuel cell of the present invention exhibits low crystallinity and thus can exert high catalytic activity (can promote catalytic reaction) by the highly dispersed catalyst metal, and the catalyst for fuel cell exhibits excellent durability against carbon corrosion and can maintain the activity since an amount of carbon edge of the catalyst-supporting carbon is small. Accordingly, a membrane electrode assembly and a fuel cell, which have a catalyst layer using such a catalyst, exhibit excellent power generation performance and durability. Therefore, the present invention provides an electrode catalyst layer for fuel cell which contains the catalyst and an electrolyte, a membrane electrode assembly for fuel cell which includes the electrode catalyst layer for fuel cell, and a fuel cell which includes the membrane electrode assembly for fuel cell.

Hereinafter, an embodiment of the catalyst of the present invention and an embodiment of a catalyst layer, a membrane electrode assembly (MEA), and a fuel cell using the catalyst will be described in detail with reference to the drawings as appropriate. However, the present invention is not limited only to the following embodiments. It should be noted that each drawing is exaggeratedly illustrated for convenience of explanation, and a dimensional ratio of each constituent in each drawing may be different from actual size. In addition, the same reference numerals are given to the same elements in the description of the drawings and redundant explanations are omitted when the embodiments of the present invention are described with reference to the drawings.

In the present Description, "X to Y" indicating the range includes X and Y and means "X or more and Y or less". In addition, operations and measurement of physical properties are conducted under the condition of room temperature (20° C. to 25° C.)/relative humidity of 40% to 50% RH unless otherwise stated.

[Fuel Cell]

A fuel cell includes a membrane electrode assembly (MEA) and a pair of separators composed of an anode (fuel electrode) side separator having a fuel gas flow path through which a fuel gas flows and a cathode (oxygen electrode) side separator having an oxidant gas flow path through which an oxidant gas flows. The fuel cell of the present embodiment exerts high power generation performance and exhibits excellent durability.

Figure 1:
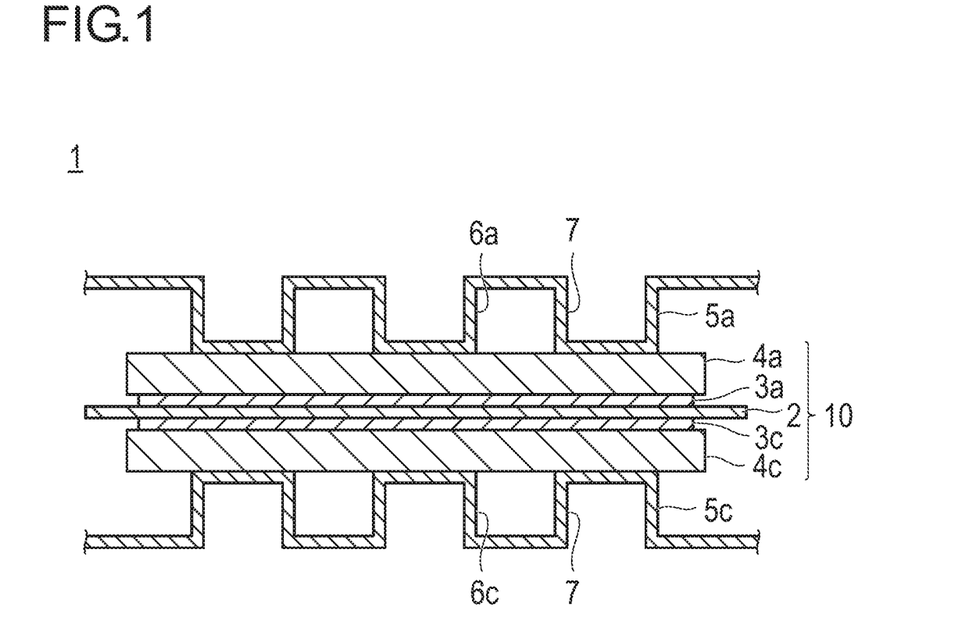
FIG. 1 is a schematic cross-sectional view illustrating a basic configuration of a polymer electrolyte fuel cell according to an embodiment of the present invention.

FIG. 1 is a schematic view which illustrates a basic configuration of a polymer electrolyte fuel cell (PEFC) 1 according to an embodiment of the present invention. The PEFC 1 includes a solid polymer electrolyte membrane 2 and a pair of catalyst layers (an anode catalyst layer 3a and a cathode catalyst layer 3c) which sandwich the solid polymer electrolyte membrane 2. Moreover, a stacked body of the solid polymer electrolyte membrane 2 and the catalyst layers (3a and 3c) is further sandwiched between a pair of gas diffusion layers (GDL) (an anode gas diffusion layer 4a and a cathode gas diffusion layer 4c). In this manner, the solid polymer electrolyte membrane 2, the pair of catalyst layers (3a and 3c), and the pair of gas diffusion layers (4a and 4 c) constitute a membrane electrode assembly (MEA) 10 in a stacked state.

In the PEFC 1, the MEA 10 is further sandwiched between a pair of separators (an anode separator 5a and a cathode separator 5c). In FIG. 1, the separators (5a and 5c) are illustrated so as to be positioned at both ends of the MEA 10 illustrated. However, in a fuel cell stack formed by stacking a plurality of MEAs, a separator is generally used also as a separator for an adjacent PEFC (not illustrated). In other words, MEAs in a fuel cell stack constitute a stack by being sequentially stacked via a separator. Incidentally, a gas seal portion is disposed between the separator (5a and 5c) and the solid polymer electrolyte membrane 2 and between the PEFC 1 and another PEFC adjacent to this PEFC 1 in an actual fuel cell stack, which is omitted in FIG. 1.

The separators (5a and 5c) can be obtained by, for example, subjecting a thin plate having a thickness of 0.5 mm or less to pressing treatment to form into a concavo-convex shape as illustrated in FIG. 1. The convex portions of the separators (5a and 5c) as viewed from the MEA side are in contact with the MEA 10. The electrical connection of the separators with the MEA 10 is secured by this. In addition, the concave portions (the space between the separator and the MEA formed by the concavo-convex shape of the separator) of the separators (5a and 5c) as viewed from the MEA side function as a gas flow path for passing a gas during the operation of the PEFC 1. Specifically, a fuel gas (for example, hydrogen) is passed through a gas flow path 6a of the anode separator 5a and an oxidant gas (for example, air) is passed through a gas flow path 6c of the cathode separator 5c.

Meanwhile, the concave portions of the separators (5a and 5c) as viewed from the side opposite to the MEA side are a refrigerant flow path 7 for passing a refrigerant (for example, water) for cooling the PEFC during the operation of the PEFC 1. Furthermore, a manifold (not illustrated) is usually provided to the separator. The manifold functions as a linking means for linking the respective cells to each other when constituting a stack. By adopting such a configuration, mechanical strength of the fuel cell stack can be secured.

Incidentally, in the embodiment illustrated in FIG. 1, the separators (5a and 5c) are formed in a concavo-convex shape. However, the separator is not limited only to such a concavo-convex form but may be in an arbitrary form such as a flat plate shape or a partial concavo-convex shape as long as it can exert the functions of a gas flow path and a refrigerant flow path.

The fuel cell having the MEA of the present invention as described above can exert excellent power generation performance and durability. Here, the kind of the fuel cell is not particularly limited, and a polymer electrolyte fuel cell has been described as an example in the above description, but examples thereof may include an alkaline fuel cell, a direct methanol fuel cell, and a micro fuel cell in addition thereto. Among these, a polymer electrolyte fuel cell (PEFC) is preferable in terms that it can be fabricated in a small size and high density/high output can be attained. The fuel cell is useful as a stationary power source and the like in addition to a power source for a moving body such as a vehicle, which has limited mounting space. Among these, it is particularly preferable that the fuel cell is used as a power source for a moving body such as motor vehicle, which is required to have a high output voltage after a relatively long time of operation stopping.

A fuel to be used when operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol, and the like can be used. Among these, hydrogen and methanol are preferably used from the viewpoint of being able to increase an output.

In addition, the application of the fuel cell is not particularly limited, but it is preferable to apply the fuel cell to a vehicle. The electrolyte membrane-electrode assembly of the present invention can exhibit excellent power generation performance and durability and miniaturization thereof can be realized. Accordingly, the fuel cell of the present invention is particularly advantageous in the case of being applied as a fuel cell of a vehicle from the viewpoint of vehicle mounting property.

Hereinafter, members constituting the fuel cell of the present embodiment will be briefly described. Incidentally, the present invention has a feature in a carbon powder having a specific B/A ratio, configurations (materials and members) well known in the art can be applied as the configurations other than this in the same manner, and the technical scope of the present invention is not limited only to the following embodiments.

[Carbon Powder (Carrier)]

The carbon powder (carrier) satisfies the following (i):

(i) a ratio (B/A) of an area B of peak 1 to an area A of peak 0 is more than 0 and 0.15 or less. As used herein, the area A is an area of peak 0 located at a position of $2\theta=22.5°$ to $25°$ as observed by XRD analysis when the carbon powder for fuel cell is subjected to heat treatment at $1800°$ C. for 1 hour in an inert atmosphere. The area B is an area of peak 1 located at a position of $2\theta=26°$ as observed by XRD analysis when the carbon powder for fuel cell is subjected to heat treatment at $1800°$ C. for 1 hour in an inert atmosphere.

Specifically, the carbon powder has low crystallinity (has a small B/A ratio). Accordingly, the catalyst metal (for example, platinum) stably adsorbs on the carbon powder, and it is thus possible to suppress/prevent sintering of a catalyst metal when supporting the catalyst metal on the carrier powder. In addition, the catalyst metal can be supported on the carbon powder exhibiting low crystallinity in a highly dispersed manner in the form of small particles. Accordingly, the catalyst having a catalyst metal supported on the carbon powder has a large specific surface area of the catalyst metal, and mass specific activity can be improved. Hence, a catalyst obtained by supporting a catalyst metal on the carbon powder of the present invention can exert high activity (for example, mass specific activity). Meanwhile, when the B/A ratio exceeds 0.15, it is difficult to support a catalyst metal thereon in a highly dispersed manner when supporting the catalyst metal. For this reason, a catalyst comprising a catalyst metal supported on the carbon powder would exhibit inferior activity. The B/A ratio is preferably more than 0 and less than 0.06 in view of further improved catalytic activity (for example, mass specific activity).

The peak 0 is a broad peak present at the position of 2θ=22.5° to 25° to be observed by XRD analysis. The peak 0 is attributed to a carbon construction exhibiting low crystallinity. In addition, the peak 1 is a sharp peak present at the position of 2θ=26° to be observed by XRD analysis, and a peak 2 is a sharp peak present at the position of 2θ=26.5° to be observed by XRD analysis. The peak 1 and peak 2 are a peak derived from the (002) plane of carbon and are attributed to a carbon construction exhibiting high crystallinity. Accordingly, a large area A of peak 0 or a small area B of peak 1 means that crystallinity of carbon is low (a catalyst metal can be supported in a highly dispersed manner). Hence, by setting the B/A ratio at a low level, activity of the catalyst when the carbon powder is used as a carrier can be effectively improved.

Incidentally, the areas A and B can be determined based on a peak (peak 0) present at the position of 2θ=22.5° to 25°, a peak (peak 1) present at the position of 2θ=26°, and a peak (peak 2) present at the position of 2θ=26.5° as measured by using an X-ray diffractometer (XRD) by the following method.

[Method for Measuring Areas A and B]

The X-ray diffraction measurement is conducted using a carbon powder (sample 2) prepared by subjecting a carbon powder (sample 1) to heat treatment at 1800° C. for 1 hour in a nitrogen atmosphere. Specifically, the carbon powder (sample 2) is prepared by subjecting the carbon powder (sample 1) to heat treatment at 1800° C. for 1 hour in a nitrogen atmosphere. This carbon powder (sample 2) is placed on a silicon nonreflective plate and the measurement is conducted by using an X-ray diffractometer RINT-TTRIII manufactured by Rigaku Corporation, to obtain an XRD pattern. Incidentally, CuKα ray is used as a radiation source in the X-ray diffraction measurement.

The XRD pattern thus obtained is subjected to fitting by the Voigt function, and the respective areas of peaks (peak 0, peak 1, and peak 2), which are located at the positions of 2θ=22.5° to 25°, 26°, and 26.5°, respectively, are calculated. Next, the ratio (B/A) of the area B of peak 1 to the area A of peak 0 is determined by dividing the area (B) of peak 1 by the area (A) of peak 0.

The carbon powder of the present invention may have any characteristics as long as it satisfies (i) described above. For example, a specific surface area of the carbon powder of the present invention is not particularly limited. The BET specific surface area per weight of the carbon powder is preferably less than 900 m$^2$/g, more preferably more than 610 m$^2$/g and 880 m$^2$/g or less, and particularly preferably from 700 to 860 m$^2$/g, in terms of a dispersed and supported state of the catalyst metal and thus further improved catalytic activity. It is possible to highly disperse (highly support) the catalyst metal to an extent to which sufficient activity can be achieved by using a carbon powder having such a specific surface area. In addition, a catalyst coverage factor with an electrolyte can be suppressed when an electrode catalyst layer is formed using a catalyst obtained by supporting a catalyst metal on such a carbon powder. Accordingly, it is possible to secure gas transportability of the electrode catalyst layer and to maintain high activity. In the present Description, the "BET specific surface area (m$^2$/g carrier)" of the carbon powder is measured by a nitrogen adsorption method. Specifically, a sample (carbon powder) is disposed in a hermetically sealed glass cell for adsorption measurement, and then the glass cell is evacuated and subjected to degasification treatment at 300° C. for 2 hours. A nitrogen adsorption isotherm is determined by conducting the measurement at 77 k (−196° C.) using a nitrogen gas as an adsorption gas. For this measurement, an automatic gas/vapor adsorption amount measuring apparatus BELSORP-18 manufactured by MicrotracBEL Corp. is used. The BET specific surface area is calculated from the measurement point at a relative pressure (P/P0) in the range of from 0.05 to 0.20.

The carbon powder of the present invention has fewer edge surfaces exhibiting weak oxidation resistance. An amount of edges can take a ratio R'(D'/G intensity ratio) of peak intensity (D' intensity) of a D' band to be measured in the vicinity of 1620 cm$^{-1}$ by Raman spectroscopy to peak intensity (G intensity) of a G band to be measured in the vicinity of 1580 cm$^{-1}$ by Raman spectroscopy as an index. A small ratio R'(D'/G intensity ratio) means a small number of edge surfaces (an edge amount is small). Specifically, the ratio R'(D'/G intensity ratio) of the carbon powder is preferably 0.30 or less. A carbon powder having the configuration described above has a small edge amount to be a starting point of electrochemical corrosion. In detail, the G band is a peak which is attributed to graphite (oscillation in a hexagonal lattice of carbon atoms) and observed in the vicinity of 1580 cm$^{-1}$ in Raman scattering analysis. The D' band is observed as a shoulder of the G band in the vicinity of 1620 cm$^{-1}$ in Raman scattering analysis. This D' band is attributed to disorder or defect of a graphite structure and appears when a crystal size of the graphite is small or a large number of edges of the graphene sheet are present. An electronic state at the edge (end portion) of a graphene molecule, unlike an electronic state at the central portion (six-membered ring) of the graphene molecule, is likely to be a starting point of carbon corrosion. In other words, a small R' value means that an edge amount of carbon (graphene), which is a starting point of electrochemical corrosion and is present in the graphite structure, is small. Accordingly, durability of a catalyst obtained using such a carbon powder having a low R' value as a carrier can be further improved. The R' value (D'/G intensity ratio) of the carbon powder is more preferably less than 0.25, still more preferably 0.24 or less, and particularly preferably 0.22 or less, from viewpoint of further improved durability. Incidentally, a lower limit of the R' value (D'/G intensity ratio) of the carbon powder is preferably as low as possible, and it is thus 0, but usually, an R' value of 0.10 or more is sufficient, and even an R' value of 0.15 or more (still 0.20 or more) is acceptable.

In the present Description, the G band to be measured in the vicinity of 1580 cm$^{-1}$ by Raman spectroscopy is also simply referred to as the "G band". In the present Description, the D' band to be measured in the vicinity of 1620 cm$^{-1}$ by Raman spectroscopy is also simply referred to as the "D' band". In addition, the peak intensities of the G band and the D' band are also referred to as the "G intensity" and the "D' intensity", respectively. Furthermore, the ratio of the D' intensity to the G intensity is also simply referred to as the "R' value" or "D'/G intensity ratio".

In the present Description, a D band to be measured in the vicinity of 1360 cm$^{-1}$ by Raman spectroscopy is also simply referred to as the "D band". In addition, peak intensity of the D band is also referred to as the "D intensity".

Here, the G band, D' band, and D band and the peak intensities thereof have been well known in the art. It is possible to see, for example, R. Vidano and D. B Fischbach, J. Am. Ceram. Soc. 61 (1978) 13-17 and G. Katagiri, H. Ishida and A. Ishitani, Carbon 26 (1988) 565-571.

In the present Description, an R' value can be determined by measuring a Raman spectrum of a carbon material by using a microscopic Raman spectroscope and calculating a relative intensity ratio of peak intensity (D' intensity) in the vicinity of 1620 cm$^{-1}$ called a D' band to peak intensity (G intensity) in the vicinity of 1580 cm$^{-1}$ called a G band, namely, a peak area ratio (D' intensity/G intensity). In addition, in the following Examples, a ratio R (D/G intensity ratio) of peak intensity (D intensity) of a D band to be measured in the vicinity of 1360 cm$^{-1}$ to G intensity is measured. As used herein, the D band is observed in the vicinity of 1360 cm$^{-1}$ in Raman scattering analysis, and is attributed to disorder or defect of a graphite structure, and appears in the case in which orientation of graphene molecules is high or a graphitization degree is high. In other words, a large R value means that a graphitization degree of carbon powder (carrier) is low. Incidentally, in the present Description, the ratio of the D intensity to the G intensity is also simply referred to as the "R value" or "D/G intensity ratio". The R value can be determined by measuring a Raman spectrum of a carbon material by using a microscopic Raman spectroscope and calculating a relative intensity ratio of peak intensity (D intensity) in the vicinity of 1360 cm$^{-1}$ called a D band to peak intensity (G intensity) in the vicinity of 1580 cm$^{-1}$ called a G band, namely, a peak area ratio (D intensity/G intensity). As these peak areas, those determined by Raman spectroscopy to be described below are adopted.

(Raman Spectroscopy)

A Raman spectrum is measured at room temperature (25° C.) for 30 seconds of exposure×4 times of integration under the following conditions by using a microscope laser Raman SENTERRA (manufactured by Bruker) as a measuring apparatus. Incidentally, the peaks of the G band, D' band, and D band can be determined by peak fitting by Gaussian distribution.

[Chem. 1]
<Measurement Conditions>
Excitation wavelength: Nd: SHG of YAG, 532 nm
Laser output: 3 mW
Spot size: ~1 μm
Detector: CCD A size of the carbon powder is not particularly limited. From the viewpoints of easiness of supporting, catalyst utilization rate, and controllability of a thickness of an electrode catalyst layer within a proper range, an average particle size (diameter) of the carbon powder is preferably approximately in the range of 5 to 2000 nm, more preferably approximately in the range of 10 to 200 nm, and particularly preferably approximately in the range of 20 to 100 nm. As the value of "average particle size of carbon powder", a value calculated as an average value of particle sizes of particles to be observed in several to several tens of visual fields by using an observation means such as a scanning electron microscope (SEM) or a transmission electron microscope (TEM) is adopted unless otherwise mentioned. Alternatively, a median diameter obtained by laser diffraction method may be adopted as the value of "average particle size of carbon powder". In addition, the term "particle size (diameter)" means a maximum distance among distances between arbitrary two points which pass through the center of a particle and are on the contour line of the particle.

The carbon powder preferably has a mesopore(s). In the present Description, the term "mesopore" means a pore having a diameter of from 2 to 50 nm. As used herein, the term "diameter (nm) of a mesopore" means a diameter of a pore measured by a nitrogen adsorption method (DH method). By this configuration, at least a part of catalyst metals is supported inside the mesopore when the catalyst metals are supported on the carbon powder (carrier). By adopting such a configuration in which the catalyst metal is supported inside the mesopore which an electrolyte cannot enter, a three-phase interface is formed by water, the catalyst metal, and a reaction gas (for example, oxygen), and thus the catalyst can be effectively utilized, and the catalytic activity can be improved. A part of catalyst metals may be supported on the surface of the carbon powder as long as at least a part of catalyst metals is supported inside the mesopore(s). However, preferably 50% by weight or more (upper limit: 100% by weight) and more preferably 80% by weight or more (upper limit: 100% by weight) of the entire catalyst metals are supported inside the mesopores from the viewpoints of improvement in an effective utilization rate of the catalyst.

In the present Description, the state that "the catalyst metal(s) is supported inside the mesopore(s)" can be confirmed by decrease in a volume of mesopores before and after the catalyst metal is supported on the catalyst carrier. Specifically, the carbon powder (carrier) has a certain volume of mesopores, but the pore volume of mesopores decreases when the catalyst metal(s) is supported inside the mesopore(s). Consequently, "the catalyst metal(s) is supported inside the mesopore(s)" when a difference [=(volume before supporting)−(volume after supporting)] between a volume of mesopore(s) of the carbon powder (carrier) before supporting the catalyst metal and a volume of mesopore(s) of the catalyst (carrier) after supporting the catalyst metal exceeds 0.

In the case when the carbon powder has mesopore(s), a pore volume of the mesopore(s) is not particularly limited but is preferably 0.9 cm$^3$/g carrier (carbon powder) or more. In other words, according to a preferred embodiment of the present invention, the carbon powder has a mesopore(s), wherein a pore volume of the mesopore(s) is 0.9 cm$^3$/g carrier (carbon powder) or more. The pore volume of the mesopore(s) is more preferably from 1.0 to 2.0 cm$^3$/g carrier (carbon powder) and particularly preferably from 1.1 to 1.5 cm$^3$/g carrier (carbon powder). When the pore volume is within such a range as described above, it is possible to contain (support) more catalyst metals in the mesopores and to physically separate an electrolyte from the catalyst metal in the catalyst layer (it is possible to more effectively suppress/prevent contact between the catalyst metal and the electrolyte). Hence, it is possible to more effectively utilize activity of the catalyst metal. In addition, the presence of a large number of mesopores can more effectively promote the catalytic reaction. As used herein, the term "pore volume of mesopore(s)" means a total volume of mesopore(s) having a diameter of from 2 to 50 nm in the carbon powder (carrier) and is represented by a volume per 1 g of carbon powder (carrier) (cm$^3$/g carrier (carbon powder)). The "pore volume of mesopore(s) (cm$^3$/g carrier)" can be calculated as an area (integrated value) of a lower portion of differential pore distribution curve determined by a nitrogen adsorption method (DH method). Incidentally, as the method for measuring the diameter and pore volume of mesopore(s) by the nitrogen adsorption method (DH method), for example, methods described in known literatures such as "Adsorption Science" (2nd Edition, written under joint authorship of Seiichi KONDO, Tatsuo ISHIKAWA, and Ikuo ABE, MARUZEN-YUSHODO Company, Limited)", "Analysis Method of Fuel Cell" (edited by Yoshio TAKASU, Masaru YOSHITAKE, and Tatsumi ISHIHARA, Kagaku-Dojin Publishing), and D. Dollion and G. R. Heal: J. Appl. Chem., 14, 109 (1964). In the present Description, the diameter and pore volume of mesopore(s) by the nitrogen adsorption method (DH method) are values measured by the method described in D. Dollion and G. R. Heal: J. Appl. Chem., 14, 109 (1964).

A method for producing the carbon powder of the present invention is not particularly limited. Hereinafter, preferred embodiments of the method for producing the carbon powder of the present invention will be described, but the present invention is not limited to the following embodiments. Specifically, (i) an organic material is mixed with a magnesium compound or an alkaline earth metal compound (step (i)); (ii) the mixture obtained in (i) above is heated to produce a carbon material and then the magnesium compound or alkaline earth metal compound is removed (step (ii)); (iii) the carbon material obtained in (ii) above is subjected to heat treatment (step (iii)); and (iv) the carbon material subjected to heat treatment in (iii) above is pulverized to decrease a particle size (step (iv)). In the steps (i) and (ii) above, a method using a thermosetting resin in known methods described in JP 2006-062954 A, JP 2012-082134 A, and JP 2014-122158 A, JP 2012-218999 A, and the like can be applied in the same manner or by being appropriately modified.

(Step (i))

In the present step, an organic material is mixed with a magnesium compound or an alkaline earth metal compound, to prepare a mixture.

The organic material as a raw material of the carbon powder is not particularly limited, but a thermosetting resin can be used.

Examples of the thermosetting resin may include, but are not limited to, phenol resins, furan resins, epoxy resins, and alkyd resins. Among these, phenol resins, which are substantially composed only of a carbon atom, a hydrogen atom, and an oxygen atom, is preferable. The carbon powder has mesopores with a proper volume when a phenol resin is used as a raw material of the carbon powder.

The organic material may be mixed with a magnesium compound or an alkaline earth metal compound in any form. Specifically, the organic material can be mixed in a solid shape such as a powder shape, a pellet shape, or a lump shape, or in the form of a solution or dispersion in which the organic material is dissolved or dispersed in a proper solvent.

The magnesium compound or alkaline earth metal compound to be mixed with the organic material is not particularly limited as long as it acts as a mold at the time of carbonization of the organic material. Specifically, examples of the alkaline earth metal may include calcium, strontium, and barium. Among these, it is preferable to mix a magnesium compound or a calcium compound with the organic material.

The magnesium compound or the alkaline earth metal compound may be in any form of magnesium or an alkaline earth metal. Specifically, examples of the magnesium compound or the alkaline earth metal compound may preferably include oxides, hydroxides, carbonates, and organic acid salts such as acetate, oxalate, citrate, acrylate, or methacrylate of magnesium or alkaline earth metal. Among these, an oxide is preferable since it can promote porosification of carbide without deteriorating a furnace for heat treatment or generating a contaminating gas in the calcination step of the next step (ii).

Each of the magnesium compound and the alkaline earth metal compound may be used singly or in the form of a mixture of two or more kinds thereof. Alternatively, the magnesium compound and the alkaline earth metal compound may be used in appropriate combination.

A mixed form of the magnesium compound or alkaline earth metal compound is not particularly limited, and examples thereof may include a powder shape, a pellet shape, a granule shape, and a paste shape. Among these, a powder shape or a granule shape is preferable from the viewpoints of homogeneous mixing property with the organic material, porosification of carbide, and the like.

A size of the magnesium compound or alkaline earth metal compound is not particularly limited. A pore size (diameter) of fine pores (particularly mesopores) of the carbon material to be obtained in the next step (ii) can be adjusted by a crystallite size of the magnesium compound or alkaline earth metal compound. Specifically, when magnesium oxide or an oxide of an alkaline earth metal generated (crystallite) is eluted with an acid, fine pores corresponding to the crystallite size of the oxide are generated in the carbon material. Accordingly, the average crystallite size is preferably selected depending on a desired size of pores (particularly mesopores) of the carbon powder. Specifically, the average crystallite size (diameter) is preferably from 2 to 50 nm. It is possible to adjust a fine pore size and a fine pore distribution of the carbon material (thus, the carbon powder of the present invention) to be obtained within a proper range when having such a crystallite size. As used herein, the term "crystallite" refers to the largest gathering to be regarded as a single crystal. As the "average crystallite size", an average of values measured for a statistically significant number (for example, 300 particles) by X-ray diffraction is adopted unless otherwise mentioned. In addition, the term "crystallite size (diameter)" means a maximum distance among distances between arbitrary two points which pass through the center of a crystallite and are on the contour line of the crystallite.

A mixing ratio of the organic material with the magnesium compound or alkaline earth metal compound is not particularly limited. It is preferable to mix the magnesium compound or alkaline earth metal compound in an amount of from 40 to 700 parts by weight and more preferably from 100 to 300 parts by weight with respect to 100 parts by weight of the organic material. Within such a mixing ratio, it would be possible to sufficiently make the carbon material porous and to more efficiently produce a carbon material (thus the carbon powder of the present invention) having a desired fine pore size and a desired fine pore distribution.

(Step (ii))

In the present step, the mixture obtained in (i) above is heated (calcined) to produce a carbon material and then the magnesium compound or alkaline earth metal compound is removed. Through this step, the organic material is carbonized/made porous to obtain a carbon material having a desired fine pore size and a desired fine pore distribution. Incidentally, before the heating (calcination), heat treatment may be conducted in order to remove the solvent from the mixture obtained in (i) above.

Conditions of heating (calcining) the mixture are not particularly limited and the heating (calcination) can be conducted in an air atmosphere or in an atmosphere of an inert gas such as argon gas or nitrogen gas. Preferably, the heating (calcination) is conducted in an inert gas atmosphere. More specifically, the mixture is charged into a heating apparatus such as an electric furnace, an interior of the heating apparatus is purged with an inert gas such as argon gas or nitrogen gas, and then the mixture is heated while blowing non-oxidizing gas into the apparatus. By this operation, the organic material is thermally decomposed (carbonized). Hence, a carbide and magnesium oxide or an oxide of alkaline earth metal remain after the heating.

The heating (calcination) conditions are not particularly limited. Specifically, a heating (calcination) temperature is preferably from 500° C. to 1500° C. and more preferably from 700° C. to 1200° C. A heating (calcination) time is preferably about from 0.5 to 5 hours and more preferably about from 1 to 2 hours. Under such conditions, the magnesium compound or alkaline earth metal compound can sufficiently effectively act on the organic material to more effectively promote the carbonization and porosification of the organic material. In addition, it is possible to further increase a specific surface area of the carbon material. Incidentally, magnesium oxide or an oxide of alkaline earth metal is thermally stable and a hydroxide, a carbonate, and an organic acid salt are thermally decomposed and converted into a stable oxide during the heat treatment. Accordingly, it is possible to safely conduct the heat treatment without deteriorating a lining refractory of a heating furnace or generating harmful gas to cause environmental pollution even in the heat treatment of the next step (iii).

The carbon material to be obtained after the present step coexists with magnesium oxide or an oxide of alkaline earth metal as described above. The carbon material can be separated by treating the product obtained in the present step (ii) with an aqueous acid solution. An acid to be used in the aqueous acid solution is not particularly limited as long as it elutes magnesium oxide or an oxide of alkaline earth metal. Specifically, examples thereof may include mineral acids such as sulfuric acid, nitric acid, and hydrochloric acid and organic acids such as acetic acid and oxalic acid. A concentration of the aqueous acid solution is also not particularly limited as long as magnesium oxide or an oxide of alkaline earth metal can be eluted out, and the concentration can be appropriately selected. After the treatment with the acid aqueous solution, it is preferable to remove the acid by filtering/washing the treated product with water and then to dry the product obtained. Through this step, a carbon material which does not substantially contain impurities can be obtained.

(Step (iii))

In the present step, the carbon material obtained in (ii) above is subjected to heat treatment.

Conditions for heat treatment of the carbon material are not particularly limited as long as the configuration (i) can be achieved. Specifically, when the organic material is a thermosetting resin, a temperature for heat treatment is preferably lower than 2000° C., more preferably from higher than 1300° C. and 1900° C. or lower, still more preferably from 1400 C to 1850° C., and particularly preferably from 1600 to 1800° C. A rate of temperature rise in the heat treatment is preferably from 100 to 1000° C./hour and particularly preferably from 300 to 800° C./hour. A time for heat treatment (retention time at a predetermined temperature for heat treatment) is not particularly limited, but it is particularly preferably 1 minute or longer and 60 minutes or shorter. Incidentally, the heat treatment is conducted in an atmosphere of an inert gas such as argon gas or nitrogen gas. Under such conditions, it is possible to easily obtain a carbon powder which satisfies the configuration (i), or the configuration (i) and the R' value, or the configuration (i), the R' value and the R value. If the conditions for heat treatment are lower than the lower limit (the conditions for heat treatment are too moderate), there is a possibility that an edge amount of carbon (graphene) cannot be sufficiently decreased. On the contrary, if the conditions for heat treatment exceed the upper limit (the conditions for heat treatment are too severe), there is a possibility that the graphitization proceeds too much that a BET specific surface area of carbon (graphene) becomes too small.

(Step (iv))

In the present step, the carbon material subjected to heat treatment in (iii) above is pulverized to decrease a particle size. Through this step, the carbon powder of the present invention in which B/A is decreased to a desired range can be obtained. Specifically, most of the carbon material obtained in (ii) above is composed of a single particle (1 particle) but not an aggregate of a plurality of fine particles. Accordingly, Accordingly, a new surface to be exposed exhibits low crystallinity as the particles are pulverized (broken) and a particle size of the particles is decreased through this step. In addition, the carbon powder subjected to the present step also has a small edge amount of carbon.

In the present step, the pulverization method is not particularly limited, and a known method can be appropriately adopted. For example, a mortar, a ball mill, a planetary ball mill, a dynamic mill, a beads mill, a jet mill, a hammer mill, a disk mill, a pin mill and the like can be used.

Conditions for pulverization are also not particularly limited as long as the B/A ratio according to the present invention can be achieved. Preferably, the pulverization conditions are conditions so that a size (particle size (diameter)) of the carbon material subjected to heat treatment in (iii) above becomes the size described above. A temperature for pulverization is not particularly limited, and is, for example, from 10° C. to 50° C. and preferably from 20° C. to 40° C. (particularly around room temperature (25° C.)). In addition, an atmosphere for pulverization is also not particularly limited and may be an air atmosphere or an inert atmosphere (for example, a nitrogen atmosphere).

[Catalyst (Electrode Catalyst)]

The present invention also provides a catalyst for fuel cell, which comprises a catalyst metal supported on the carbon powder for fuel cell of the present invention. Specifically, the catalyst (electrode catalyst) is composed of the carbon powder (carrier) and a catalyst metal to be supported on the carbon powder.

The catalyst metal serves to catalyze electrochemical reaction. A catalyst metal to be used in the anode catalyst layer is not particularly limited as long as it can catalyze oxidation of hydrogen, and a known catalyst can be used in the same manner. A catalyst metal to be used in the cathode catalyst layer is also not particularly limited as long as it can catalyze reduction of oxygen, and a known catalyst can be used in the same manner. Specifically, the catalyst metal can be selected from metals such as platinum, ruthenium, iridium, rhodium, palladium, osmium, tungsten, lead, iron, copper, silver, chromium, cobalt, nickel, manganese, vanadium, molybdenum, gallium, and aluminum and alloys thereof.

Among these, those containing at least platinum are preferably used in order to improve catalytic activity, poisoning resistance against carbon monoxide and the like, heat resistance, and the like. In other words, the catalyst metal is preferably platinum or contains platinum and a metal component other than platinum, and the catalyst metal is more preferably platinum or a platinum-containing alloy. Such a catalyst metal can exert high activity. Particularly when the catalyst metal is platinum, it is possible to disperse platinum having a small particle size on the surface of the carbon powder (carrier) and thus to maintain a surface area of platinum per weight even when an amount of platinum used is decreased. In addition, it is preferable that the catalyst metal contains platinum and a metal component other than platinum from the viewpoint of cost since an amount of expensive platinum used can be decreased. A composition of the alloy may be varied depending on the kind of the metal to be alloyed, but it is preferable that a content of platinum is set to from 30% to 90% by atom and a content of the metal to be alloyed with platinum is set to from 10% to 70% by atom. Incidentally, an alloy is generally a generic term that it comprises one or more kinds of metal elements or non-metal elements added to a metal element and has metallic properties. As the construction of the alloy, there are a eutectic alloy of a so-called mixture in which constituent elements are separate crystals, one in which constituent elements completely melt into each other to form a solid solution, one in which constituent elements form an intermetallic compound or a compound of a metal and a non-metal, and the like, and the construction of the alloy may be any of these in the present embodiment. In this case, the catalyst metal to be used in the anode catalyst layer and the catalyst metal to be used in the cathode catalyst layer can be appropriately selected from the above. In the present Description, descriptions of the catalyst metals for the anode catalyst layer and the cathode catalyst layer are the same definitions for both of them unless otherwise stated. However, the catalyst metals for the anode catalyst layer and the cathode catalyst layer are not required to be the same as each other and can be appropriately selected so as to exert a desired action as described above.

A shape and size of the catalyst metal (catalyst component) are not particularly limited, and a similar shape and size as those of known catalyst components can be adopted. As the shape, for example, a particulate shape, a flaky shape, a layered shape, and the like can be used, but the shape is preferably a particulate shape. In this case, an average particle size (diameter) of the catalyst metal (catalyst metal particles) is not particularly limited, but it is preferably 3 nm or more, more preferably more than 3 nm and 30 nm or less, and particularly preferably more than 3 nm and 10 nm or less. When the average particle size of the catalyst metal is 3 nm or more, the catalyst metal is relatively firmly supported on the carbon powder (for example, in mesopores of the carbon powder) and the catalyst metal is more effectively suppressed/prevented from contacting with an electrolyte in the catalyst layer. In addition, it is possible to prevent elution of the catalyst metal due to a potential change and also to suppress a time dependent decrease in the performance. Accordingly, it is possible to further improve catalytic activity, that is, to more efficiently promote catalytic reaction. Meanwhile, when the average particle size of the catalyst metal particles is 30 nm or less, it is possible to support the catalyst metal on the carbon powder (for example, inside mesopores of the carbon powder) by a simple method and to decrease an electrolyte coverage factor by the catalyst metal. The "average particle size of catalyst metal particles" in the present invention can be measured as a crystallite diameter to be determined from a full width at half maximum of a diffraction peak of the catalyst metal component in X-ray diffraction or as an average of particle sizes of catalyst metal particles to be examined by using a transmission electron microscope (TEM).

In the present embodiment, a content ($mg/cm^2$) of the catalyst metal per unit catalyst coated area is not particularly limited as long as a sufficient degree of dispersion of the catalyst on the carrier and sufficient power generation performance can be obtained, and it is, for example, from 0.01 to 1 $mg/cm^2$. However, when the catalyst contains platinum or a platinum-containing alloy, a content of platinum per unit catalyst coated area is preferably 0.5 $mg/cm^2$ or less. The use of expensive precious metal catalysts typified by platinum (Pt) and a platinum alloy has become a factor of high price of fuel cells. Hence, it is preferable to decrease an amount of expensive platinum used (content of platinum) to the above range and thus to cut down a cost. The lower limit is not particularly limited as long as power generation performance can be obtained, and it is, for example, 0.01 $mg/cm^2$ or more. More preferably, the content of platinum is from 0.02 to 0.4 $mg/cm^2$. In the present embodiment, since it is possible to improve activity per catalyst weight by controlling a pore structure of the carrier, it is possible to decrease an amount of expensive catalyst used.

In the present Description, inductively coupled plasma emission spectroscopy (ICP) is used for the measurement (confirmation) of the "content of catalyst (platinum) per unit catalyst coated area ($mg/cm^2$)". Those skilled in the art can easily conduct a method of achieving a desired "content of catalyst (platinum) per unit catalyst coated area ($mg/cm^2$)", and the amount can be adjusted by controlling a composition (concentration of catalyst) and coating amount of a slurry.

An amount of the catalyst supported on the carrier (referred to as a supported rate in some cases) is set to be preferably from 10% to 80% by weight and more preferably from 20% to 70% by weight with respect to the total amount of the catalyst-supported body (namely, the carrier and the catalyst). It is preferable that the supported amount is in the above range since sufficient dispersion degree of the catalyst component on the carrier, improvement in power generation performance, economic advantages, and catalytic activity per unit weight can be achieved.

A structure of the catalyst is not particularly limited as long as the carbon powder satisfies (i) above. In other words, the catalyst can have the same structure as the conventional one except that the carbon powder of the present invention is used as a carrier.

A method for producing the catalyst (method of supporting a catalyst metal on the carbon powder) is not particularly limited. Preferably, a method which comprises precipitating a catalyst metal on a surface of a catalyst carrier and then subjecting to heat treatment to increase a particle size of the catalyst metal is preferable. In the method described above, the heat treatment is conducted after the precipitation to increase a particle size of the catalyst metal. By this, it is possible to support a catalyst metal having a large particle size inside pores (particularly mesopores) of the catalyst carrier. In other words, the present invention also provides a method for producing the catalyst of the present invention, which includes (a) precipitating a catalyst metal on a surface of a catalyst carrier (precipitation step); and (b) subjecting a product after the precipitation step to heat treatment to increase a particle size of the catalyst metal (heat treatment step). Hereinafter, the method will be described, but the present invention is not limited to the following embodiments.

Hereinafter, preferred embodiments of the method for producing a catalyst will be described, but the present invention is not limited to the following embodiments.

(a) Precipitation Step

In the present step, a catalyst metal is precipitated on the surface of a catalyst carrier. The present step is a known method, and for example, a method which comprises immersing a catalyst carrier in a precursor solution of catalyst metal and then reducing the precursor of catalyst metal is preferably used.

The precursor of a catalyst metal is not particularly limited and is appropriately selected depending on the kind of the catalyst metal to be used. Specific examples thereof may include a chloride, a nitrate, a sulfate, a chloride, an acetate, and an amine compound of the catalyst metals such as platinum. More specific examples thereof may preferably include chlorides such as platinum chloride (hexachloroplatinic acid hexahydrate), palladium chloride, rhodium chloride, ruthenium chloride, and cobalt chloride, nitrates such as palladium nitrate, rhodium nitrate, and iridium nitrate, sulfates such as palladium sulfate and rhodium sulfate, acetates such as rhodium acetate, and ammine compounds such as dinitrodiammine platinum nitrate and dinitrodiammine palladium. A solvent to be used in the preparation of a precursor solution of catalyst metal is not particularly limited as long as it can dissolve a precursor of the catalyst metal, and it can be appropriately selected depending on the kind of the precursor of the catalyst metal to be used. Specifically, examples thereof may include water, an acid, an alkali, and an organic solvent. A concentration of the precursor of the catalyst metal in the precursor solution of the catalyst metal is not particularly limited, but it is preferably from 0.1% to 50% by weight and more preferably from 0.5% to 20% by weight in terms of metal.

Examples of the reductant may include hydrogen, hydrazine, sodium borohydride, sodium thiosulfate, citric acid, sodium citrate, L-ascorbic acid, sodium borohydride, formaldehyde, methanol, ethanol, ethylene, and carbon monoxide. Incidentally, a substance, which is gaseous at room temperature, such as hydrogen, can also be supplied by bubbling. An amount of the reductant is not particularly limited as long as the precursor of the catalyst metal can be reduced to the catalyst metal, and a known amount can be applied in the same manner.

Conditions for precipitation are not particularly limited as long as the catalyst metal can be precipitated on the catalyst carrier. For example, a temperature for precipitation is preferably a temperature around a boiling point of the solvent and more preferably from room temperature to 100° C. A time for precipitation is preferably from 1 to 10 hours and more preferably from 2 to 8 hours. The precipitation step may be conducted while stirring/mixing the mixture if necessary.

By this, the precursor of the catalyst metal is reduced to the catalyst metal and the catalyst metal is precipitated (supported) on the catalyst carrier.

(b) Heat Treatment Step

In the present step, a product after the precipitation step (a) is subjected to heat treatment to increase a particle size of the catalyst metal.

Conditions for heat treatment are not particularly limited as long as the particle size of the catalyst metal can be increased. For example, a temperature for heat treatment is preferably from 300° C. to 1200° C., more preferably from 500° C. to 1150° C., and particularly preferably from 700° C. to 1000° C. A time for heat treatment is preferably from 0.02 to 3 hours, more preferably from 0.1 to 2 hours, and particularly preferably from 0.2 to 1.5 hours. Incidentally, the heat treatment step may be conducted in a hydrogen atmosphere.

By this, a particle size of the catalyst metal is increased on the catalyst carrier (particularly in mesopores of the catalyst carrier). Accordingly, the catalyst metal particles are less likely to desorb to the outside of the system (from the catalyst carrier). Hence, the catalyst can be more effectively utilized.

[Catalyst Layer]

As mentioned above, the catalyst of the present invention can exert high catalytic activity, that is, can promote the catalytic reaction. In addition, the catalyst of the present invention can exhibit excellent durability. Accordingly, the catalyst of the present invention can be suitably used in an electrode catalyst layer for fuel cell. In other words, the present invention also provides an electrode catalyst layer for fuel cell, which contains the electrode catalyst of the present invention and an electrolyte. The electrode catalyst layer for fuel cell of the present invention can exert high performance and durability.

Incidentally, the electrode catalyst layer for fuel cell of the present invention can be used in the same manner as in the prior art or by being appropriately modified except that the carbon powder of the present invention is used as a carrier. Accordingly, preferred embodiments of the catalyst layer will be described below, but the present invention is not limited to the following embodiments.

In the catalyst layer, the catalyst is covered with an electrolyte but the electrolyte does not enter mesopores of the catalyst (particularly the carrier). Accordingly, the catalyst metal on the surface of the carrier is in contact with the electrolyte but the catalyst metal supported inside the mesopore is in a state of not being in contact with the electrolyte. A reaction active area of the catalyst metal can be secured as the catalyst metal in the mesopores forms a three-phase interface with oxygen gas and water in a state of not being in contact with the electrolyte.

The catalyst of the present invention may be present in either a cathode catalyst layer or an anode catalyst layer, but it is preferably used in the cathode catalyst layer. As mentioned above, the catalyst of the present invention can be effectively utilized as it forms a three-phase interface with water even without being in contact with an electrolyte, but this is because water is generated in the cathode catalyst layer.

The electrolyte is not particularly limited, but it is preferably an ion conductive polymer electrolyte. The polymer electrolyte is also called a proton conductive polymer since it plays a role of transmitting protons generated on the periphery of the catalyst active material on a fuel electrode side.

The polymer electrolyte is not particularly limited, and conventionally known knowledge can be appropriately referred to. The polymer electrolyte is roughly classified into a fluorine-based polymer electrolyte and a hydrocarbon-based polymer electrolyte depending on the kind of ion exchange resin as a constituent material.

Examples of the ion exchange resin constituting the fluorine-based polymer electrolyte may include perfluorocarbon sulfonic acid-based polymers such as Nafion (registered trademark, manufactured by DuPont), Aciplex (registered trademark, manufactured by Asahi Kasei Corp.), and FLEMION (registered trademark, manufactured by Asahi Glass Co., Ltd.), a perfluorocarbon phosphonic acid-based polymer, a trifluorostyrene sulfonic acid-based polymer, an ethylene-tetrafluoroethylene-g-styrene sulfonic acid-based polymer, an ethylene-tetrafluoroethylene copolymer, and a polyvinylidene fluoride-perfluorocarbon sulfonic acid-based polymer. From the viewpoint of excellent heat resistance, chemical stability, durability, and mechanical strength, the fluorine-based polymer electrolytes are preferably used and a fluorine-based polymer electrolyte composed of a perfluorocarbon sulfonic acid-based polymer is particularly preferably used.

Specific examples of the hydrocarbon-based electrolyte may include sulfonated polyethersulfone (S-PES), sulfonated polyarylether ketone, sulfonated polybenzimidazole alkyl, phosphonated polybenzimidazole alkyl, sulfonated polystyrene, sulfonated polyether ether ketone (S-PEEK), and sulfonated polyphenylene (S-PPP). The hydrocarbon-based polymer electrolytes are preferably used from the viewpoint of production that the raw material is inexpensive, the production process is simple, and the selectivity for materials is high. Incidentally, only one kind of the ion exchange resins described above may be used singly or two or more kinds thereof may be used concurrently. In addition, the polymer electrolyte is not limited to the materials described above, and other materials may be used.

In the polymer electrolyte responsible for the transfer of protons, conductance of protons is important. When EW of the polymer electrolyte is too large, ion conductivity in the whole catalyst layer decreases. Accordingly, the catalyst layer of the present embodiment preferably contains a polymer electrolyte having a small EW. Specifically, the catalyst layer of the present embodiment preferably contains a polymer electrolyte having an EW of 1500 g/eq. or less, more preferably contains a polymer electrolyte having an EW of 1200 g/eq. or less, and particularly preferably contains a polymer electrolyte having an EW of 1100 g/eq. or less.

Meanwhile, when EW is too small, hydrophilicity is too high to make smooth movement of water difficult. From such a viewpoint, the EW of the polymer electrolyte is preferably 600 g/eq. or more. Incidentally, equivalent weight (EW) represents an equivalent weight of an exchange group exhibiting proton conductivity. The equivalent weight is a dry weight of an ion exchange membrane per 1 equivalent of an ion exchange group and is expressed in a unit of "g/eq".

It is preferable that the catalyst layer contains two or more kinds of polymer electrolytes having different EWs in a power generation surface and a polymer electrolyte having the lowest EW among the polymer electrolytes is used in a region in which relative humidity of gas in a flow path is 90% or less. By adopting such a material disposition, resistance decreases regardless of a current density region and cell performance can be improved. It is desirable that EW of a polymer electrolyte to be used in the region in which the relative humidity of gas in the flow path is 90% or less, namely, a polymer electrolyte having the lowest EW is 900 g/eq. or less. By this, the effect described above can be more reliably and remarkably exerted.

Further, it is desirable to use a polymer electrolyte having the lowest EW in a region in which a temperature is higher than an average temperature of cooling water at an inlet and an outlet. By this, resistance decreases regardless of a current density region and cell performance can be improved.

Furthermore, it is desirable to use a polymer electrolyte having the lowest EW in a region in the range to be within 3/5 from a gas supply port of at least either of a fuel gas or an oxidant gas with respect to a flow path length from the viewpoint of decreasing resistance of a fuel cell system.

The catalyst layer may optionally contain an additive such as a water repellent such as polytetrafluoroethylene, polyhexafluoropropylene and a tetrafluoroethylene-hexafluoropropylene copolymer, a dispersant such as a surfactant, a thickener such as glycerin, ethylene glycol (EG), polyvinyl alcohol (PVA) and propylene glycol (PG), and a pore-forming agent.

A thickness (dried film thickness) of the catalyst layer is preferably from 0.05 to 30 µm, more preferably from 1 to 20 µm, and still more preferably from 2 to 15 µm. Incidentally, the thickness above can be applied to both the cathode catalyst layer and the anode catalyst layer. However, the thicknesses of the cathode catalyst layer and the anode catalyst layer may be the same as or different from each other.

(Method for Producing Catalyst Layer)

Hereinafter, preferred embodiments for producing a catalyst layer will be described, but the technical scope of the present invention is not limited only to the following embodiments. In addition, various conditions such as materials of the respective constituents of the catalyst layer are as described above and the description thereof is thus omitted.

First, a carbon powder (also referred to as a "porous carrier" or "conductive porous carrier" in the present Description) as a carrier is prepared. Specifically, the carbon powder may be fabricated as described in the method for producing a carbon powder above.

Subsequently, a catalyst is supported on the carbon powder to obtain a catalyst powder. The supporting of the catalyst on the carbon powder can be conducted by a known method. For example, known methods such as an impregnation method, a liquid phase reduction supporting method, an evaporation dry solidification method, a colloid adsorption method, an atomized pyrolysis method, and a reverse micelle (microemulsion method) can be used.

Subsequently, a catalyst ink containing a catalyst powder, a polymer electrolyte, and a solvent is prepared. The solvent is not particularly limited, and a usual solvent to be used for forming a catalyst layer can be used in the same manner. Specifically, examples thereof may include water such as tap water, pure water, ion exchanged water, and distilled water, cyclohexanol, lower alcohols having from 1 to 4 carbon atoms such as methanol, ethanol, n-propanol, isopropanol, n-butanol, sec-butanol, isobutanol, and tert-butanol, propylene glycol, benzene, toluene, and xylene. In addition to these, butyl acetate alcohol, dimethyl ether, ethylene glycol, and the like may be used as the solvent. One kind of these solvents may be used singly or these solvents may be used in a state of a mixed solution of two or more kinds thereof.

An amount of the solvent constituting the catalyst ink is not particularly limited as long as the electrolyte can be completely dissolved therein. Specifically, a concentration of total solids of the catalyst powder, the polymer electrolyte, and the like is preferably set to be about from 1% to 50% by weight and more preferably about from 5% to 30% by weight in the electrode catalyst ink.

In the case of using an additive such as a water repellent, a dispersant, a thickener, and a pore-forming agent, the additive(s) may be added to the catalyst ink. In this case, an amount of the additive(s) added is not particularly limited as long as the effects by the present invention described above are not interfered. For example, the amount of the additive is preferably from 5% to 20% by weight with respect to the entire weight of the electrode catalyst ink.

Next, the catalyst ink is coated on the surface of a substrate. A method for coating the substrate is not particularly limited, and a known method can be used. Specifically, the coating can be conducted by a known method such as a spray (spray coating) method, a Gulliver printing method, a die coater method, a screen printing method, or a doctor blade method.

As the substrate on which the catalyst ink is coated, a solid polymer electrolyte membrane (electrolyte layer) or a gas diffusion substrate (gas diffusion layer) can be used. In such a case, a catalyst layer can be formed on the surface of the solid polymer electrolyte membrane (electrolyte layer) or the gas diffusion substrate (gas diffusion layer) and then the stacked body thus obtained can be utilized in the production of a membrane electrode assembly as it is. Alternatively, a releasable substrate such as a polytetrafluoroethylene (PTFE) [Teflon (registered trademark)] sheet may be used as a substrate, a catalyst layer may be formed on the substrate, and then the catalyst layer portion may be peeled off from the substrate, thereby obtaining a catalyst layer.

Finally, the coating layer (film) of the catalyst ink is dried at a temperature from room temperature to 150° C. for 1 to 60 minutes in an air atmosphere or an inert gas atmosphere. By this, a catalyst layer is formed.

(Membrane Electrode Assembly/Fuel Cell)

According to a further embodiment of the present invention, a membrane electrode assembly for fuel cell including the electrode catalyst layer for fuel cell and a fuel cell including the membrane electrode assembly for fuel cell are provided. In other words, a membrane electrode assembly for fuel cell including a solid polymer electrolyte membrane 2, a cathode catalyst layer 3c disposed on one side of the electrolyte membrane, an anode catalyst layer 3a disposed on the other side of the electrolyte membrane, and a pair of gas diffusion layers (4a and 4c) sandwiching the electrolyte membrane 2 and the anode catalyst layer 3a and the cathode catalyst layer 3c is provided. In this membrane electrode assembly, at least either of the cathode catalyst layer or the anode catalyst layer is the catalyst layer of the embodiment described above.

From viewpoints of necessity of improvement in proton conductivity and transport property (gas diffusibility) of a reaction gas (particularly $O_2$), at least the cathode catalyst layer is preferably the catalyst layer of the embodiment described above. However, the catalyst layer according to the above embodiment may be used as the anode catalyst layer or both the cathode catalyst layer and the anode catalyst layer, and the use of the catalyst layer is not particularly limited.

According to a further embodiment of the present invention, a fuel cell including the membrane electrode assembly of the embodiment described above is provided. In other words, an embodiment of the present invention relates to a fuel cell including a pair of an anode separator and a cathode separator which sandwich the membrane electrode assembly of the embodiment described above.

Hereinafter, the constituents of PEFC 1 using the catalyst layer of the embodiment described above will be described with reference to FIG. 1. However, the present invention is characterized by the catalyst layer. Hence, with regard to specific embodiments of members other than the catalyst layer constituting the fuel cell, modifications can be made as appropriate while referring to conventionally known knowledge.

(Electrolyte Membrane)

An electrolyte membrane is composed of, for example, a solid polymer electrolyte membrane 2 as illustrated in FIG. 1. The solid polymer electrolyte membrane 2 serves to selectively allow protons generated in the anode catalyst layer 3a at the time of operation of the PEFC 1 to permeate to the cathode catalyst layer 3c along the film thickness direction. In addition, the solid polymer electrolyte membrane 2 has a function as a partition wall for not allowing a fuel gas to be supplied to the anode side to mix with an oxidant gas to be supplied to the cathode side.

An electrolyte material constituting the solid polymer electrolyte membrane 2 is not particularly limited and conventionally known knowledge can be appropriately referred to. For example, the fluorine-based polymer electrolyte and the hydrocarbon-based polymer electrolyte previously described as a polymer electrolyte can be used. In this case, it is not necessarily required to use the same polymer electrolyte as that used in the catalyst layer.

A thickness of the electrolyte layer may be appropriately determined in consideration of characteristics of the fuel cell to be obtained, and it is not particularly limited. The thickness of the electrolyte layer is usually about from 5 to 300 µm. When the thickness of the electrolyte layer is within such a range, balance between strength at the time of film formation and durability at the time of use or output characteristics at the time of use can be properly controlled.

(Gas Diffusion Layer)

Gas diffusion layers (anode gas diffusion layer 4a and cathode gas diffusion layer 4c) serves to promote diffusion of gas (fuel gas or oxidant gas) supplied through gas flow paths (6a and 6c) of a separator into the catalyst layers (3a and 3c) and serves as an electron conduction path.

A material constituting the substrate of the gas diffusion layers (4a and 4c) is not particularly limited, and conventionally known knowledge can be appropriately referred to. Examples thereof may include a sheet-like material exhibiting conductivity and porosity such as a carbon fabric, a paper-like papermaking body, a felt, or a nonwoven fabric. A thickness of the substrate may be appropriately determined in consideration of characteristics of the gas diffusion layer to be obtained, but it may be about from 30 to 500 µm. When the thickness of the substrate is within such a range, balance between mechanical strength and diffusibility of gas, water and the like can be properly controlled.

The gas diffusion layer preferably contains a water repellent for the purpose of further enhancing water repellency and preventing a flooding phenomenon and the like. The water repellent is not particularly limited, but examples thereof may include fluorine-based polymer materials such as polytetrafluoroethylene (PTFE), polyvinylidene fluoride (PVdF), polyhexafluoropropylene, and a tetrafluoroethylene-hexafluoropropylene copolymer (FEP), polypropylene, and polyethylene.

In addition, the gas diffusion layer may have a carbon particle layer (microporous layer; MPL, not illustrated) composed of carbon particles containing a water repellent on the catalyst layer side of the substrate in order to further improve water repellency.

The carbon particles to be contained in the carbon particle layer are not particularly limited, and conventionally known materials such as carbon black, graphite, and expanded graphite can be appropriately adopted. Among these, carbon black such as oil furnace black, channel black, lamp black, thermal black, or acetylene black can be preferably used since it exhibits excellent electron conductivity and has a large specific surface area. An average particle size of the carbon particles is preferably set to about from 10 to 100 nm. This makes it possible to improve contact property with the catalyst layer as well as to obtain high drainage property by capillary force.

Examples of the water repellent to be used in the carbon particle layer may include the same water repellents as those described above. Among these, a fluorine-based polymer material can be preferably used since it exhibits excellent water repellency, corrosion resistance at the time of electrode reaction, and the like.

A mixing ratio of the carbon particles to the water repellent in the carbon particle layer is preferably set to be about from 90:10 to 40:60 (carbon particles:water repellent) in terms of weight ratio in consideration of better balance between water repellency and electron conductivity. A thickness of the carbon particle layer is also not particularly limited and may be appropriately determined in consideration of water repellency of the gas diffusion layer to be obtained.

(Method for Producing Membrane Electrode Assembly)

A method for fabricating the membrane electrode assembly is not particularly limited, and a conventionally known method can be used. It is possible to use, for example, a method which comprises transferring or coating a catalyst layer on a solid polymer electrolyte membrane by hot pressing and drying to obtain a laminate, and joining a gas diffusion layer to the laminate, a method which comprises coating a catalyst layer on a microporous layer side of a gas diffusion layer (one surface of a substrate layer in the case of not including the microporous layer) and drying to obtain two gas diffusion electrodes (GDE), and joining the gas diffusion electrodes to both surfaces of a solid polymer electrolyte membrane by hot pressing. Conditions for coating and joining by hot pressing and the like may be appropriately adjusted depending on the kind (perfluorosulfonic acid-based or hydrocarbon-based) of the polymer electrolyte in the solid polymer electrolyte membrane and the catalyst layer.

(Separator)

The separator serves to electrically connect respective cells in series when a plurality of single cells of a fuel cell such as a polymer electrolyte fuel cell are connected in series to constitute a fuel cell stack. In addition, the separator also has a function as a partition wall, which separates a fuel gas, an oxidant gas, and a refrigerant from each other. In order to secure flow paths therefor, it is preferable that each of the separators is provided with gas flow paths and a cooling flow path as described above. As a material constituting the separator, conventionally known materials such as carbon such as dense carbon graphite and a carbon plate, and a metal such as stainless steel can be appropriately adopted without being limited. A thickness and size of the separator, a shape and size of each flow path to be provided, and the like are not particularly limited and can be appropriately determined in consideration of desired output characteristics and the like of a fuel cell to be obtained.

A method for producing a fuel cell is not particularly limited, and knowledge conventionally known in the field of fuel cells can be appropriately referred to.

Further, a fuel cell stack having a structure in which a plurality of membrane electrode assemblies are stacked via a separator and connected in series may be formed so that the fuel cell can exert a desired voltage. A shape and the like of the fuel cell are not particularly limited and may be appropriately determined so as to obtain cell characteristics such as a desired voltage.

The PEFC and membrane electrode assembly described above use a catalyst layer exhibiting excellent power generation performance and durability. Consequently, the PEFC and the membrane electrode assembly exhibit excellent power generation performance and durability.

The PEFC of the present embodiment and a fuel cell stack using the same can be mounted on, for example, a vehicle as a power source for driving.

EXAMPLES

The effects of the present invention will be described with reference to the following Examples and Comparative Examples. However, the technical scope of the present invention is not limited only to the following Examples.

Example 1

A carrier A was prepared as follows. Specifically, a phenol resin (a solution resin dispersed in a solvent (methanol)) and magnesium oxide powder were mixed at a weight ratio (in terms of solids) of 3:7, and the resultant mixture was then subjected to heat treatment at 120° C. for 2 hours in an air atmosphere to remove the solvent, thereby obtaining a mixed powder. The resultant powder was subjected to heat treatment at 900° C. for 1 hour in a nitrogen atmosphere. The mixed powder obtained through the heat treatment was put in a dilute aqueous solution of sulfuric acid and sufficiently stirred at room temperature (25° C.) and then the resultant was filtered, sufficiently washed with water, and then dried, thereby producing a carbon material A1.

Next, the carbon material A1 was heated to 1800° C. in a nitrogen atmosphere and then subjected to heat treatment at 1800° C. for 1 hour, thereby producing a carbon material A2. The carrier A was produced by pulverizing the carbon material A2 by using a disk mill. A median diameter of the resultant carrier A, as measured by a laser diffraction method, was about 2 μm.

A ratio (B/A) of an area B of peak 1 to an area A of peak 0 in the carrier A thus obtained was measured, to find to be 0.056. Incidentally, an area of peak 0 (area A) was calculated by taking a peak observed at $2\theta=23.92°$ as the peak 0. An R value and an R' value of the carrier A thus obtained were measured, to find to be 0.99 and 0.19, respectively. Further, a pore volume of mesopores and a BET specific surface area of the carrier A were measured, to find to be 1.15 $cm^3/g$ and 700 $m^2/g$, respectively.

Example 2

A carrier B was prepared as follows.

Specifically, a carbon material A1 was produced in the same manner as in Example 1.

Next, the resultant carbon material A1 was heated to 1600° C. in a nitrogen atmosphere and then subjected to heat treatment at 1600° C. for 1 hour, thereby producing a carbon material B2. The resultant carrier B was produced by pulverizing the carbon material B2 by using a disk mill.

A ratio (B/A) of an area B of peak 1 to an area A of peak 0 in the carrier B thus obtained was measured, to find to be 0.033. Incidentally, an area of peak 0 (area A) was calculated by taking a peak observed at $2\theta=23.92°$ as the peak 0. An R value and an R' value of the carrier B thus obtained were measured, to find to be 1.2 and 0.22, respectively. Further, a pore volume of mesopores and a BET specific surface area of the carrier B were measured, to find to be 1.32 $cm^3/g$ and 860 $m^2/g$, respectively.

Comparative Example 1

A carrier C was produced according to the same method as in Example 1 except that the carbon material A1 was not subjected to pulverization using a disk mill in Example 1. In other words, the carrier C corresponds to the carbon material A2 in Example 1.

A ratio (B/A) of an area B of peak 1 to an area A of peak 0 in the carrier C thus obtained was measured, to find to be 0.171. Incidentally, an area of peak 0 (area A) was calculated by taking a peak observed at $2\theta=23.92°$ as the peak 0. An R value and an R' value of the carrier C thus obtained were measured, to find to be 1.12 and 0.25, respectively. Further, a pore volume of mesopores and a BET specific surface area of the carrier C were measured, to find to be 1.20 $cm^3/g$ and 610 $m^2/g$, respectively.

Example 3

The was used, and A catalyst powder A was obtained by using the carrier A obtained in Example 1 to support platinum (Pt) having an average particle size of more than 3 nm and 5 nm or less as a catalyst metal on the carrier A so as to have a supported rate of 30% by weight. Specifically, 46 g of the carrier A was immersed in 1000 g of a dinitrodiammine platinum nitrate solution (platinum content: 46 g) having a platinum concentration of 4.6% by weight, and stirred, and then 100 ml of 100% ethanol as a reductant was added thereto. The resultant solution was stirred and mixed at the boiling point for 7 hours, to support platinum on the carrier A. Thereafter, the resultant mixture was filtered and dried, thereby obtaining a catalyst powder having a supported rate of 30% by weight. Thereafter, the catalyst powder was retained at a temperature of 900° C. for 1 hour in a hydrogen atmosphere, thereby obtaining a catalyst powder A.

Example 4

A catalyst powder B was obtained by conducting the same operation as in Example 3 except that the carrier B obtained in Example 2 was used instead of the carrier A in Example 3.

The catalyst powder B thus obtained was evaluated for durability of carbon oxidation by using RDE according to the following method. As a result, the number of cycles which were able to be repeated until a potential of reduction current reached 0.5 V or less was 8000. From the results above, it is considered that a catalyst using the carbon powder of the present invention has a small decrease in electric double layer capacity and can maintain significantly high activity (exhibit excellent durability).

Experiment 1: Evaluation on Durability

A three electrode type electrochemical cell was used and an electrochemical system HZ-5000+HR301 manufactured by HOKUTO DENKO CORP. was used as a potentiostat. As a working electrode, an electrode obtained by dispersing each of the catalyst powders obtained in Examples and Comparative Examples in a mixed solvent of water and 1-propanol as a dispersion medium to prepare an ink, coating the ink on a glassy carbon rotary electrode (GC-RDE) (φ (diameter)=5 mm) so as to have a dried film thickness of 1 μm and drying the ink was used. Carbon was used as a counter electrode and a reversible hydrogen electrode (RHE) was used as a reference electrode. 0.1 M perchloric acid saturated with $O_2$ was used as an electrolytic solution. The measurement was conducted at 60° C. (liquid temperature).

The calculation of effective catalyst surface area (ECA) was conducted by cyclic voltammetry (CV). The potential scanning was conducted at a potential of 1.0 V for 30 seconds prior to the measurement. Thereafter, a potential range of from 1.0 to 1.5 V was raised (1 second) and lowered (1 second) at a potential sweep rate of 0.5 V/s, and this was taken as one cycle (2 seconds/cycle). As this potential cycle is repeated, a peak potential of quinone-hydroquinone reduction current in the vicinity of 0.6 V to be measured by a cyclic voltammetry method shifts to a lower potential side as well as a potential cycle increases. A state of carbon was estimated from a change in this reduction current and the number of cycles which were able to be repeated until the potential of the reduction current reached 0.5 V or less was taken as an index of durability.

Comparative Example 2

A catalyst powder C was obtained by conducting the same operation as in Example 3 except that the carrier C obtained in Comparative Example 1 was used instead of the carrier A in Example 3.

Example 5

A membrane electrode assembly (1) (MEA (1)) was fabricated as follows.
(Preparation of Cathode Catalyst Ink)
The catalyst powder A obtained in Example 3 was mixed with an ionomer dispersion (Nafion (registered trademark) D2020, EW=1100 g/mol, manufactured by DuPont) as a polymer electrolyte so that a weight ratio of the polymer electrolyte (ionomer) to the carrier A was 0.9 (mixture 1). Separately, a mixed solvent 1 having a mixed weight ratio of water to n-propyl alcohol (NPA) of 60:40 was prepared. The mixed solvent 1 was added to the mixture 1 prepared above so that a solid content rate (Pt+carbon carrier+ionomer) was 7% by weight, thereby preparing a cathode catalyst ink.
(Preparation of Anode Catalyst Ink)
Ketjen black (particle diameter: 30 to 60 nm) was used as a carrier, and platinum (Pt) having an average particle size of 2.5 nm as a catalyst metal was supported on the carrier so as to have a supported rate of 50% by weight, thereby obtaining a catalyst powder. The resultant catalyst powder was mixed with an ionomer dispersion (Nafion (registered trademark) D2020, EW=1100 g/mol, manufactured by DuPont) as a polymer electrolyte so that a weight ratio of the polymer electrolyte (ionomer) to the carbon carrier was 0.9 (mixture 2). Separately, a mixed solvent 2 having a mixed weight ratio of water to n-propyl alcohol (NPA) of 50:50 was prepared. The mixed solvent 2 was added to the mixture 2 prepared above so that a solid content rate (Pt+carbon carrier+ionomer) was 7% by weight, thereby preparing an anode catalyst ink.
(Assembling of Membrane Electrode Assembly (1) (MEA (1))
A gasket (Teonex, film thickness: 25 μm (adhesive layer: 10 μm) manufactured by Dupont Teijin Films) was disposed on the periphery of both surfaces of a polymer electrolyte membrane (NAFION NR211, thickness: 25 μm, manufactured by DuPont). Subsequently, the cathode catalyst ink prepared above was coated on the exposed portion of one surface of the polymer electrolyte membrane in a size of 5 cm×2 cm by a spray coating method. The catalyst ink was dried by keeping the stage for spray coating at 60° C. for 1 minute, thereby obtaining a cathode catalyst layer. An amount of platinum supported at this time is 0.15 mg/cm². Next, an anode catalyst layer was formed by conducting spray coating of the anode catalyst ink prepared above on the electrolyte membrane on the side on which the cathode catalyst layer was not formed and the heat treatment in the same manner as the cathode catalyst layer (stacked body 1).

Both surfaces of the stacked body 1 thus obtained were sandwiched between gas diffusion layers (24BC, manufactured by SGL CARBON SE), thereby obtaining a membrane electrode assembly (1) (MEA (1)).

Example 6

A membrane electrode assembly (2) (MEA (2)) was fabricated by conducting the same operation as in Example 5 except that the catalyst powder B obtained in Example 4 was used instead of the catalyst powder A in Example 5.

Comparative Example 3

A membrane electrode assembly (3) (MEA (3)) was fabricated by conducting the same operation as in Example 5 except that the catalyst powder C obtained in Comparative Example 2 was used instead of the catalyst powder A in Example 5.

Next, the MEAs (1) and (2) fabricated in Examples 5 to 6 above and the MEA (3) fabricated in Comparative Example 3 above were evaluated for power generation performance according to the following method.

Experiment 2: Evaluation on Electrochemical Characteristics

The MEAs (1) and (2) fabricated in Examples 5 to 6 above and the MEA (3) fabricated in Comparative Example 3 above were evaluated for effective electrochemical surface area (ECA), oxygen reduction reaction (ORR) area specific activity, and ORR mass specific activity according to the following methods. The results are presented in the following Table 1. Incidentally, a ratio of area B of peak 1 to area A of peak 0 is referred to as "B/A ratio" in the following Table 1.

(Measurement of Effective Electrochemical Surface Area (ECA))

An effective electrochemical surface area (ECA: electrochemical surface area) of the catalyst layer (cathode catalyst layer) as a target electrode is determined by cyclic voltammetry. Humidified hydrogen gas is circulated in the counter electrode (anode) so as to be saturated at a measurement temperature (80° C.), which is used as a reference electrode and a counter electrode. Humidified nitrogen gas is circulated in the target electrode (cathode) in the same manner, the valves at the inlet and outlet of the target electrode are closed, and nitrogen gas is introduced immediately before the measurement is started. In this state, the measurement is conducted under the following conditions by using an electrochemical measurement apparatus (model number: HZ-5000, manufactured by HOKUTO DENKO CORP.).
[Chem. 2]
Electrolytic solution: 1 M sulfuric acid (for measurement of harmful metals, manufactured by Wako Pure Chemical Industries, Ltd.)
Scanning speed: 50 mV/s
Number of cycles: 3 cycles
Lower limit value of voltage: 0.02V
Upper limit value of voltage: 0.9V
(Measurement of ORR Area Specific Activity)

An area specific activity per platinum surface area of the catalyst layer (cathode catalyst layer) as the target electrode is determined. Humidified hydrogen gas is circulated in the counter electrode (anode) so as to be saturated at a measurement temperature (80° C.), which is used as a reference electrode and a counter electrode. Humidified oxygen gas is circulated in the target electrode (cathode) in the same manner. The gas pressure in both electrodes is set to 150 kPa (abs), the current value is measured when the potential of the target electrode with respect to the opposite electrode reaches 0.9 V, and the ORR area specific activity is calculated by dividing the current value by an effective catalyst surface area (ECA). Incidentally, the effective catalyst surface area can be estimated from an amount of catalyst metal supported on the ECA and the target electrode.
(Estimation of ORR Mass Specific Activity)

A mass specific activity per platinum mass of the catalyst layer (cathode catalyst layer) as the target electrode is determined. The mass specific activity per platinum mass can be determined from the area specific activity per platinum area determined in the (measurement of ORR area specific activity) described above and ECA which is the platinum area per platinum mass.

TABLE 1

| | MEA | Catalyst powder | Carrier | B/A ratio | R' value | R value | Carrier BET specific surface area $(m^2/g)$ | Volume of mesopores $(cm^3/g)$ | ORR mass specific activity Initial $(i_{0.9v})$ ($\mu$A/g pt) |
|---|---|---|---|---|---|---|---|---|---|
| Example 5 | (1) | A | A | 0.056 | 0.19 | 0.99 | 700 | 1.15 | 332 |
| Example 6 | (2) | B | B | 0.033 | 0.22 | 1.2 | 860 | 1.32 | 327 |
| Comparative Example 3 | (3) | C | C | 0.171 | 0.25 | 1.12 | 610 | 1.20 | 226 |

From the results in Table 1, it can be noted that the MEAs (1) and (2) using the catalyst powders A and B of the present invention can exhibit superior oxygen reduction reaction activity (namely, power generation performance) as compared to the MEA (3) using the catalyst powder C in which the B/A ratio and/or R' value are out of the present invention.

REFERENCE SIGNS LIST

1 Polymer electrolyte fuel cell (PEFC)
2 Solid polymer electrolyte membrane
3a Anode catalyst layer
3c Cathode catalyst layer
4a Anode gas diffusion layer
4c Cathode gas diffusion layer
5a Anode separator
5c Cathode separator
6a Anode gas flow path
6c Cathode gas flow path
7 Refrigerant flow path
10 Membrane electrode assembly (MEA)

The invention claimed is:
1. A carbon powder for fuel cell comprising:
carbon as a main component, the carbon including:
a first peak having an area A at a position of $2\theta=22.5°$ to $25°$ as observed by XRD analysis when the carbon powder for fuel cell is subjected to heat treatment at 1800° C. for 1 hour in an inert atmosphere; and
a second peak having an area B at a position of $2\theta=26°$ as observed by XRD analysis when the carbon powder for fuel cell is subjected to heat treatment at 1800° C. for 1 hour in an inert atmosphere, wherein a ratio (B/A) of the area B of the second peak to the area A of the first peak is greater than 0 and less than or equal to 0.15.

2. The carbon powder according to claim 1, which has at least one mesopore, wherein a pore volume of the mesopore is 0.9 cm$^3$/g carrier or more.

3. The carbon powder according to claim 1, wherein the ratio (B/A) of the area B of the second peak to the area A of the first peak is more than 0 and less than 0.06.

4. The carbon powder according to claim 1, which has a BET specific surface area per weight of less than 900 m$^2$/g.

5. The carbon powder according to claim 1, which has a ratio R'(D'/G intensity ratio) of peak intensity (D' intensity) of D' band as measured in the vicinity of 1620 cm$^{-1}$ by Raman spectroscopy to peak intensity (G intensity) of G band as measured in the vicinity of 1580 cm' by Raman spectroscopy of 0.30 or less.

6. A catalyst for fuel cell comprising a catalyst metal supported on the carbon powder for fuel cell set forth in claim 1.

7. The catalyst for fuel cell according to claim 6, wherein the catalyst metal is platinum or contains platinum and a metal component other than platinum.

8. An electrode catalyst layer for fuel cell comprising the catalyst for fuel cell set forth in claim 6 and an electrolyte.

9. A membrane electrode assembly for fuel cell comprising the electrode catalyst layer for fuel cell set forth in claim 8.

10. A fuel cell comprising the membrane electrode assembly for fuel cell set forth in claim 9.

11. The carbon powder according to claim 2, wherein the pore volume of the at least one mesopore is 1.0 to 2.0 cm$^3$/g carrier.

12. The carbon powder according to claim 1, which has a ratio R (D/G intensity ratio) of peak intensity (D intensity) of D band as measured in the vicinity of 1360 cm$^{-1}$ by Raman spectroscopy to peak intensity (G intensity) of G band as measured in the vicinity of 1580 cm$^{-1}$ by Raman spectroscopy of 0.99 or more.

13. The carbon powder according to claim 5, wherein the ratio R'(D'/G intensity ratio) is 0.10 to 0.24.

14. The carbon powder according to claim 4, wherein the BET specific surface area per weight is more than 610 m$^2$/g and 880 m$^2$/g or less.

15. The electrode catalyst layer according to claim 8, wherein the carbon powder has a mesopore, at least a part of the catalyst metal is supported inside the mesopore, and the catalyst metal supported inside the mesopore is in a state of not being in contact with the electrolyte.

* * * * *